(12) United States Patent
Oda

(10) Patent No.: US 9,988,978 B2
(45) Date of Patent: Jun. 5, 2018

(54) FOUR-CYCLE MULTI-CYLINDER ENGINE

(71) Applicant: SUZUKI MOTOR CORPORATION, Hamamatsu-Shi, Shizuoka (JP)

(72) Inventor: Tomoyuki Oda, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days. days.

(21) Appl. No.: 15/259,326

(22) Filed: Sep. 8, 2016

(65) Prior Publication Data

US 2017/0101928 A1   Apr. 13, 2017

(30) Foreign Application Priority Data

Oct. 13, 2015  (JP) ................. 2015-202357

(51) Int. Cl.
| | |
|---|---|
| *F02B 61/02* | (2006.01) |
| *F01M 13/00* | (2006.01) |
| *F01P 3/02* | (2006.01) |
| *F02B 75/02* | (2006.01) |
| *F02B 75/18* | (2006.01) |
| *B62K 11/04* | (2006.01) |
| *B62K 21/02* | (2006.01) |
| *B62K 21/12* | (2006.01) |

(52) U.S. Cl.
CPC ............ *F02B 61/02* (2013.01); *F01M 13/00* (2013.01); *F01P 3/02* (2013.01); *F02B 75/02* (2013.01); *F02B 75/18* (2013.01); *B62K 11/04* (2013.01); *B62K 21/02* (2013.01); *B62K 21/12* (2013.01); *F01M 2013/0038* (2013.01); *F01P 2050/16* (2013.01); *F02B 2075/027* (2013.01); *F02B 2075/1816* (2013.01)

(58) Field of Classification Search
CPC .... F02B 2075/027; F02B 39/04; F02B 75/20; F02B 75/18; F02F 7/0007
See application file for complete search history.

(56) References Cited

U.S. PATENT DOCUMENTS

| | | | | |
|---|---|---|---|---|
| 7,219,646 | B2 * | 5/2007 | Ueshima ................. | F02B 61/02 123/179.25 |
| 7,430,993 | B2 * | 10/2008 | Yasui ....................... | F01P 3/02 123/41.44 |
| 8,448,740 | B2 * | 5/2013 | Inui ......................... | F16H 61/32 180/292 |
| 8,925,500 | B2 * | 1/2015 | Kisaichi ................... | F01M 1/02 123/198 C |
| 9,062,599 | B2 * | 6/2015 | Harada .................... | F16C 9/02 |
| 2010/0192897 | A1 | 8/2010 | Ohmori et al. | |

(Continued)

FOREIGN PATENT DOCUMENTS

JP      2010174776 A      8/2010

*Primary Examiner* — Long T Tran
(74) *Attorney, Agent, or Firm* — Troutman Sanders LLP

(57) ABSTRACT

A four-cycle multi-cylinder engine includes a crankcase, a cylinder block, a crankshaft, and a gear-shift input shaft. The crankcase is vertically divided into an upper case and a lower case. The cylinder block is integrated with the crankcase. The crankshaft and the gear-shift input shaft are journaled to a contact surface of the crankcase. The cylinder block is inclined rearward such that an extended line intersects with a cylinder axis line of the cylinder block at an acute angle in an engine side view. The extended line connects respective central axes of the crankshaft and the gear-shift input shaft.

5 Claims, 7 Drawing Sheets

(56) References Cited

U.S. PATENT DOCUMENTS

| | | | |
|---|---|---|---|
| 2015/0114336 A1* | 4/2015 | Matsuda | F01M 1/02 123/196 A |
| 2015/0114364 A1* | 4/2015 | Matsuda | F02B 39/12 123/559.1 |
| 2015/0184586 A1* | 7/2015 | Tanaka | F02B 33/40 123/559.1 |

* cited by examiner

F I G. 4
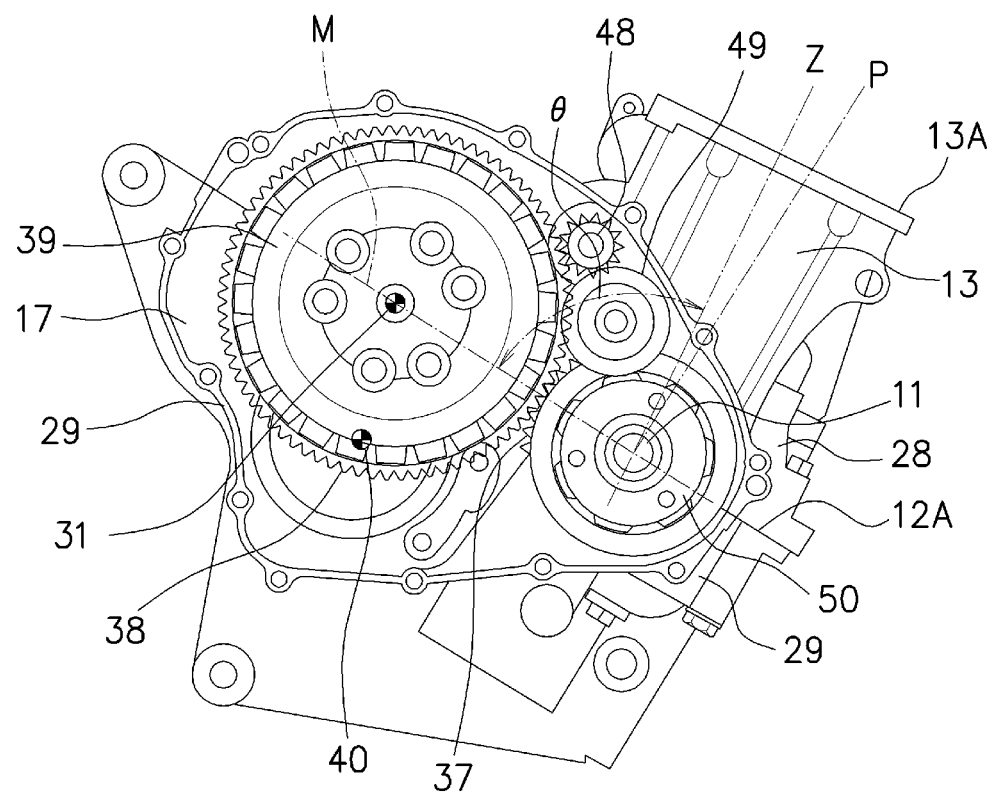

FOUR-CYCLE MULTI-CYLINDER ENGINE

CROSS-REFERENCE TO RELATED APPLICATION

This application is based upon and claims the benefit of priority of the prior Japanese Patent Application No. 2015-202357, filed on Oct. 13, 2015, the entire contents of which are incorporated herein by reference.

BACKGROUND OF THE INVENTION

Field of the Invention

The present invention typically relates to a four-cycle multi-cylinder engine preferable for motorcycles or similar vehicles.

Description of the Related Art

To improve controllability and stability of motorcycles, disposing a shaft center of a crankshaft at an appropriate position with respect to a position of a front wheel is required. In the case where a cylinder is inclined forward with respect to the position of the crankshaft, a cylinder head projects forward. Therefore, when an appropriate clearance is attempted to be secured between a radiator, an exhaust pipe, and a similar member; and the front wheel, there is no choice but to dispose the shaft center of the crankshaft rearward. This makes it difficult to configure the shaft center of the crankshaft at the appropriate position with respect to the position of the front wheel, consequently making it difficult to improve the controllability and stability.

For example, Patent Document 1 discloses an example of an engine that includes an upper crankcase integrated with a cylinder and the cylinder is appropriately inclined forward.

As conventional measures, there has been provided a method that turns an entire engine rearward around a drive shaft (an output shaft) to shift a cylinder head rearward. This aims to secure an appropriate clearance between a radiator and a similar member; and a front wheel without shaft center of a crankshaft being disposed rearward.

Patent Document 1: Japanese Laid-open Patent Publication No. 2010-174776

However, with the conventional engine, turning the entire engine rearward heightens vertical positions of the crankshaft, the cylinder head, and a similar member, rather inhibiting the controllability and stability. Additionally, spaces for an air cleaner box and a fuel tank disposed above the engine are restricted, causing a problem such as a difficulty in securing capacities for these spaces.

Further, an extension of a wheel base is applicable as another method for the measures; however, this causes a problem such as an increase in vehicle weight and an increase in minimum rotation radius.

SUMMARY OF THE INVENTION

The present invention has been made in view of the above-described problems, and it is an object of the present invention to provide a four-cycle multi-cylinder engine that effectively achieves an improvement in controllability and stability and a similar feature while an appropriate positional relationship with other components is secured.

A four-cycle multi-cylinder engine of the present invention includes a crankcase, a cylinder block, a crankshaft, and a gear-shift input shaft. The crankcase is vertically divided into an upper case and a lower case. The cylinder block is integrated with the crankcase. The crankshaft and the gear-shift input shaft are journaled to a contact surface of the crankcase. The cylinder block is inclined rearward such that an extended line intersects with a cylinder axis line of the cylinder block at an acute angle in an engine side view. The extended line connects respective central axes of the crankshaft and the gear-shift input shaft.

The four-cycle multi-cylinder engine of the present invention is configured as follows. The cylinder block has a U shape at a rear surface of the cylinder block and a lower side of the water jacket. The U shape is formed on the cylinder block on the cylinder axis line side with respect to a surface formed vertically from a profile of a contact surface with a cylinder head to the contact surface of the crankcase. A starter motor is disposed on the U shape.

The four-cycle multi-cylinder engine of the present invention is configured as follows. The U shape is disposed at an approximate center in an engine width direction.

The four-cycle multi-cylinder engine of the present invention is configured as follows. A breather chamber integrated with the upper case at a rear of the starter motor.

BRIEF DESCRIPTION OF THE DRAWINGS

FIG. 4 is a right side view illustrating a state of removing a clutch cover from a crankcase according to the embodiment of the present invention;

DETAILED DESCRIPTION OF THE PREFERRED EMBODIMENTS

The following describes preferable embodiments of a four-cycle multi-cylinder engine according to the present invention with reference to the drawings.

Figure 1:
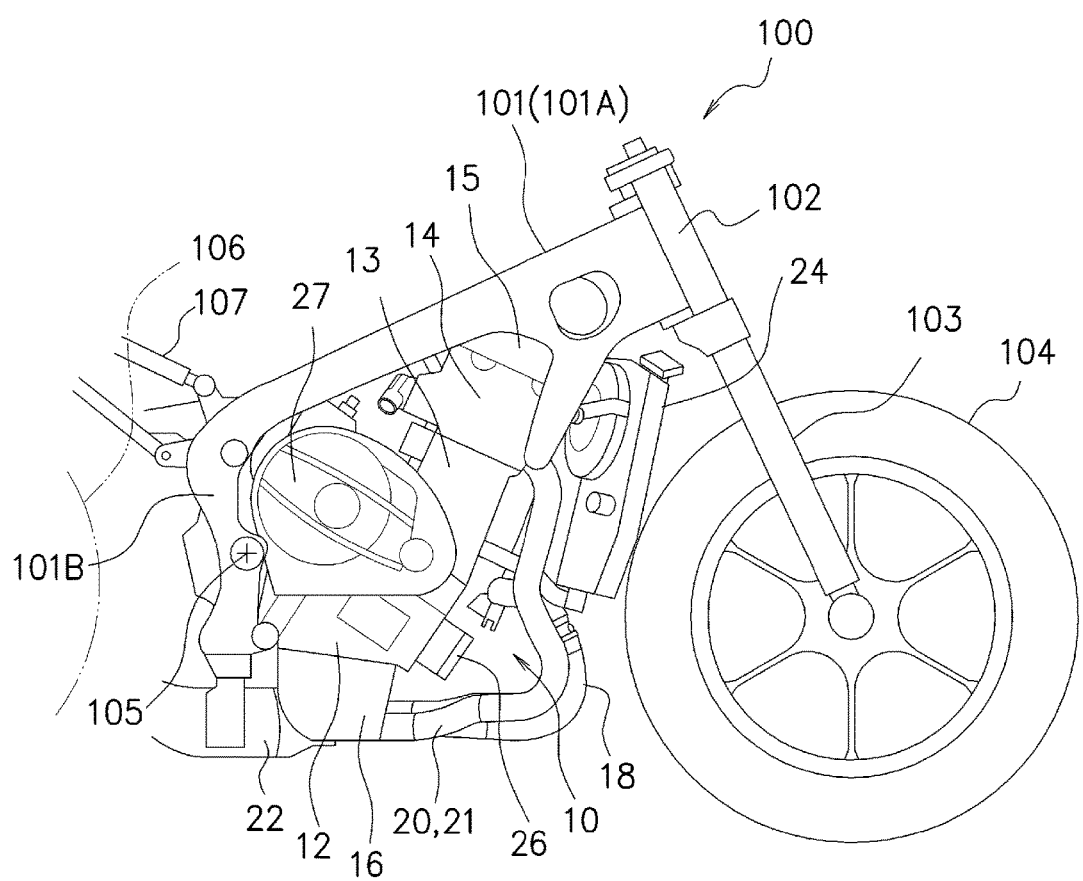
FIG. 1 is a side view of a motorcycle according to an embodiment of the present invention.
Figure 2:
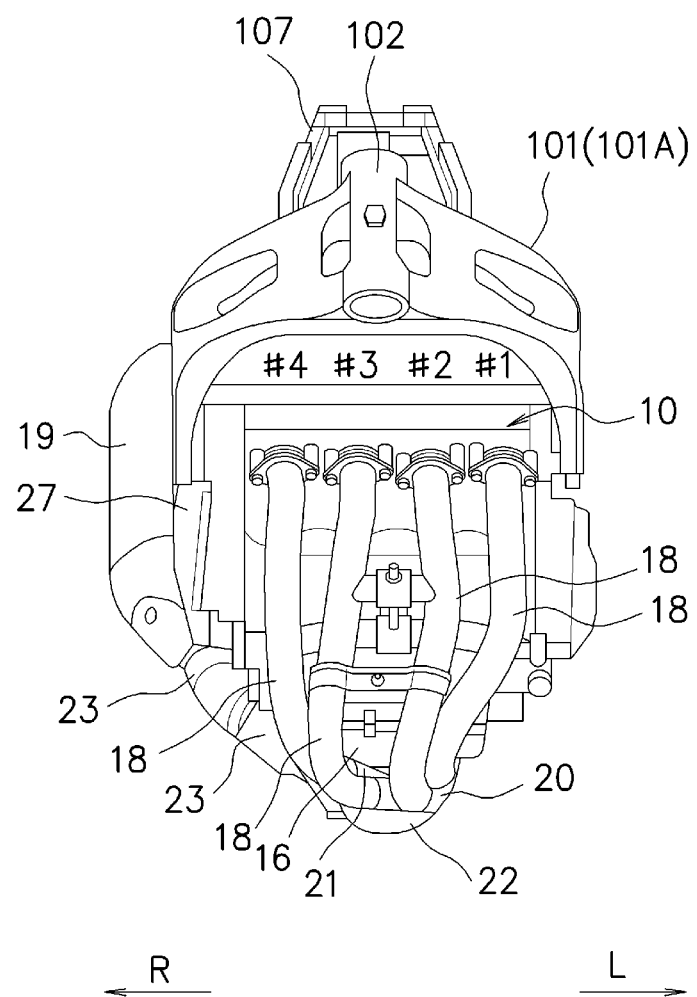
FIG. 2 is a front view illustrating around an engine mounted to a vehicle body according to the embodiment of the present invention.

FIG. 1 is a side view illustrating an exemplary configuration of main parts of a motorcycle 100 as an application example of the present invention. FIG. 2 is a front view illustrating around an engine mounted to a vehicle body. First, with reference to FIG. 1 and FIG. 2, the following describes the configuration of the main parts of the motorcycle 100; however, illustrations of some parts are omitted. Here, in the drawings including FIG. 1 used in the following description, as necessary, the front side of a vehicle is shown by an arrow Fr and the rear side of the vehicle is shown by an arrow Rr. The lateral right side of the vehicle is shown by an arrow R and the lateral left side of the vehicle is shown by an arrow L.

In FIG. 1 and FIG. 2, the motorcycle 100 has a vehicle body frame 101 made of steel or aluminum alloy material, and this vehicle body frame 101 supports the configuration members including an engine or the components. In the front portion of the vehicle body frame 101, two right and left front forks 103 are disposed. The front forks 103 are supported by a steering head pipe 102 turnably to the right and left. To the upper end of the front fork 103, a handlebar is secured via a steering bracket. In the lower portion of the front forks 103, a front wheel 104 is rotatably supported and a front fender is mounted to cover the upper portion of the front wheel 104.

The vehicle body frame 101 is joined integrally to the rear portion of the steering head pipe 102 and branches into a right and left pair of two portions rearward. The vehicle body frame 101 is constituted of a main frame portion 101A, which extends from the steering head pipe 102 while widening downward to the rear, and a pivot frame portion 101B, which is welded to the main frame portion 101A and extends downward to the rear, as what is called a twin-spar frame. The main frame portion 101A and the pivot frame portion 101B are joined together, and have a three-dimensional structure where a space is formed inside as a whole. Inside the space, an engine 10 is mounted to the vehicle body frame 101.

In the middle of the pivot frame portion 101B of the vehicle body frame 101 in the up-down direction, a swing arm is joined swingably via a pivot axis 105 in the up-down direction. On the rear end of the swing arm, a rear wheel 106 (a part of the rear wheel 106 is omitted by two-dot chain line) is rotatably supported. Across the vehicle body frame 101 and the swing arm, a rear shock absorber is mounted. Specifically, the lower end side of the rear shock absorber is coupled to both the vehicle body frame 101 and the swing arm via a link mechanism. On the rear wheel 106, a driven sprocket is axially supported. A power transmission chain is wound around between a drive sprocket on the engine 10 side and the driven sprocket of the rear wheel 106. The engine power is transmitted from the drive sprocket to the driven sprocket via the chain. This rotatably drives the rear wheel 106. In the closest vicinity of the rear wheel 106, a rear fender is disposed. The rear fender covers the vicinity of the front upper portion of the rear wheel 106.

From the vicinity of the rear portion of the vehicle body frame 101 to the upper side of the rear wheel 106, a seat rail 107 extends rearward while being appropriately upward to the rear. This seat rail 107 supports a seat (sitting seat). On the front side of the seat, a fuel tank is mounted.

In the vehicle exterior, the front portion and both right and left side portions of the vehicle are mainly covered with respective cowlings (hereinafter referred to simply as cowls). In this example, an upper cowl, a body cowl, an under cowl, and a similar member integrally cover the vehicle front portion, and side cowls cover both side portions of the vehicle. In the vehicle rear portion, a seat cowl covers and surrounds the seat.

Figure 3:
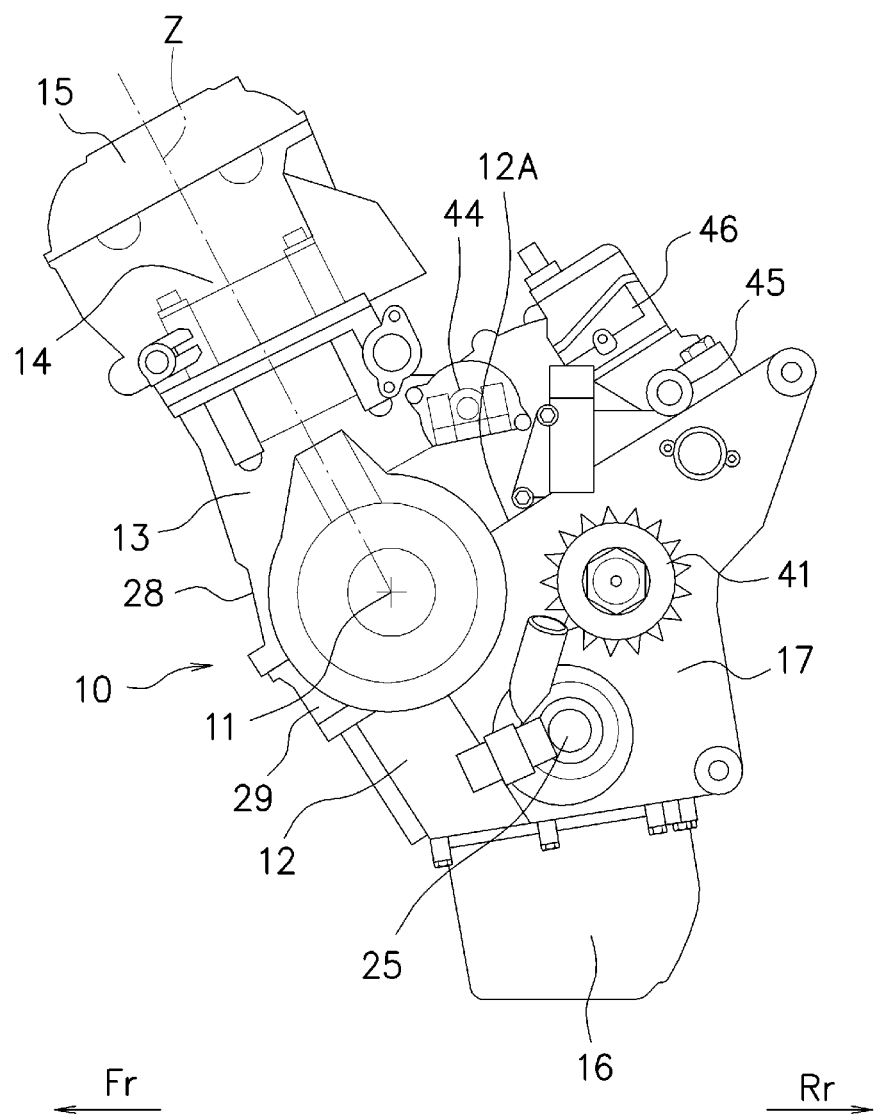
FIG. 3 is a left side view of the engine according to the embodiment of the present invention.

Approximately in the vehicle center of the motorcycle 100, as illustrated in FIG. 1 and FIG. 2, the engine 10 is mounted and supported on the vehicle body frame 101. The engine 10 in this embodiment employs a water-cooled multi-cylinder four-cycle gasoline engine. The engine 10 is a parallel multi-cylinder engine where cylinders are arranged side by side in the right-left direction (the vehicle-width direction). Specifically, the engine 10 is a parallel four-cylinder engine and cylinders #1 to #4 (note that the following simply describes the cylinders #1 to #4 as "#1" and similar expressions) are collocated from the left in the right-left direction. FIG. 3 is a left side view of the engine 10 according to the embodiment. With reference to FIG. 3 as well, over a crankcase 12, which houses a crankshaft 11 horizontally supported in the right-left direction, a cylinder block 13, a cylinder head 14, and a cylinder head cover 15 are integrally joined to be sequentially overlapped. Under the crankcase 12, an oil pan 16 is attached. Here, a cylinder axis line Z of the engine 10 is arranged to be appropriately inclined forward. This engine 10 is suspended via a plurality of engine mounts (engine suspending portions) to be integrally combined and supported on the inside of the vehicle body frame 101, and itself acts as the rigid member of the vehicle body frame 101.

In the rear portion of the crankcase 12, a transmission case 17 is integrally formed. Inside this transmission case 17, a countershaft and a plurality of transmission gears, which will be described later, are arranged. The power of the engine 10 is transmitted from the crankshaft 11 through the transmission and finally to the drive sprocket, which is the output end of the engine 10. This drive sprocket rotatably drives the rear wheel 106 (FIG. 1) via the power transmission chain as described above.

Here, the crankcase 12 and the transmission case 17 are integrally combined together, and wholly constitute a casing assembly of an engine unit including the engine 10. In the appropriate positions in this casing assembly, a plurality of auxiliary machines including a starter motor for starting the engine, a clutch device, which will be described later, and a similar member are mounted or combined. The entire engine unit including these is supported by the vehicle body frame 101.

To the engine 10, additionally, an intake system, an exhaust system, a cooling system, a lubricating system, and a control system (ECU: Engine Control Unit) are attached. The intake system supplies air-fuel mixture containing air (intake air) and fuel supplied from an air cleaner and a fuel supply device, respectively. The exhaust system discharges burnt exhaust gas from the engine 10. The cooling system cools the engine 10. The lubricating system lubricates movable parts of the engine 10. The control system controls the operations of these systems. The control of the control system causes the plurality of functional systems to collaborate with the above-described auxiliary machines or similar members so as to perform a smooth operation as the entire engine unit.

The respective functional systems will be described. Firstly, in the intake system, each cylinder has an air intake opening (an intake port) opened on the rear side of the cylinder head 14, and this air intake opening couples to a throttle body via an air intake pipe (an intake pipe). The throttle body is mounted with a throttle valve that opens and closes an intake passage or a passage formed inside the throttle body corresponding to the accelerator position, so as to control the flow rate of the air supplied from an air cleaner. In this example, the throttle valve axes of the respective cylinders are coaxially arranged. This throttle valve axes are mechanically, electrically, or electromagnetically driven by a valve driving mechanism.

On the other hand, the respective throttle bodies have injectors for fuel injection arranged in the downstream of the throttle valves. To these injectors, fuel in the fuel tank is supplied by a fuel pump. In this case, each injector couples to, in its upper side, a delivery pipe laterally bridged in the vehicle-width direction. The fuel is delivered from the delivery pipe coupled to the fuel pump. Each injector injects the fuel to the intake passage inside the throttle body at a predetermined timing by the control by the above-described control system. This causes supply of air-fuel mixture at a predetermined air-fuel ratio to the cylinder block 13 of each cylinder.

Next, in the exhaust system, each cylinder has an air exhaust opening (an exhaust port) opened on the front side of the cylinder head 14, and this air exhaust opening couples to an air exhaust pipe (an exhaust pipe) 18. The air exhaust pipes 18 of the respective cylinders once extend downward from the air exhaust openings, and are joined to be integrated in the lower side of the crankcase 12. The air exhaust pipe 18 extends rearward, and a muffler 19 is mounted on the rear end of the air exhaust pipe 18.

In this case, the exhaust pipe 18 at the cylinder #1 joins the exhaust pipe 18 at the cylinder #2 at a joining portion 20, and the exhaust pipe 18 at the cylinder #3 joins the exhaust pipe 18 at the cylinder #4 at a joining portion 21. Further, the mutual joining of the joining portion 20 with the joining portion 21 collects the four exhaust pipes 18 at the cylinders #1 to #4 to a single collecting pipe 22 at an approximately left downward of the oil pan 16. The collecting pipe 22 is coupled to the muffler 19 via a coupling pipe 23.

In the cooling system, near the cylinder block 13 and the cylinder head 14, a water jacket, which is formed to circulate cooling water, is constituted. A radiator 24, which is a heat exchanger cooling the cooling water supplied to this water jacket, is equipped. Blowing travelling air by the radiator 24 dissipates heat of the cooling water passing through the inside. In this example, the radiator 24 has an approximately laterally-long rectangular (rectangle) shape in a front view. As illustrated in FIG. 1, the radiator 24 is arranged extending while being appropriately inclined rearward from the vicinity of the lower portion of the steering head pipe 102 to the vicinity of the front side of the exhaust pipe 18 on the front of the cylinder block 13. The cylinder block 13 of the engine 10 is approximately covered with the radiator 24 in a front view. Here, the radiator 24 is supported using the vehicle body frame 101 and a similar member in an appropriate position.

The cooling system of this example, as illustrated in FIG. 3, includes a water pump 25 at the left side wall portion of the crankcase 12. The water pump 25 is coordinately driven with an oil pump, for example, built into the crankcase 12. This water pump 25 and the water jacket are mutually coupled with a cooling water hose. The water pump 25 and the radiator 24 are mutually coupled with another cooling water hose. The cooling water cooled by the radiator 24 is supplied to the water pump 25 via the cooling water hose. The water pump 25 discharges the cooling water cooled by the radiator 24 and causes the cooling water to pass through inside the water jacket, thus cooling the engine. The cooling water passing through inside the water jacket is supplied to the radiator 24 via the cooling water hose. The radiator 24 cools the cooling water supplied from the engine 10 and supplies the water pump 25 with the cooling water via the cooling water hose again, thus repeating the cooling water circulation in the cooling system.

Further, the lubricating system is constituted to supply lubricating oil to the movable parts of the engine unit to lubricate these movable parts. This lubricating system includes valve gears, which are constituted around the crankshaft 11 and inside the cylinder head 14, a cam chain, which couples these valve gears, the transmission, and a similar member. In this embodiment, for the lubricating system, an oil pump driven using a rotational force of the crankshaft 11 directly or indirectly as a driving source is built into the crankcase 12. A trochoid pump or a similar pump is used as the oil pump. This oil pump supplies the lubricating oil absorbed up from the oil pan 16 to the lubricating system. An oil filter 26 (FIG. 1) is mounted to the lower portion on the front side of the crankcase 12. Before the lubricating oil is supplied to the lubricating system, the oil filter 26 purifies the lubricating oil.

Figure 5:
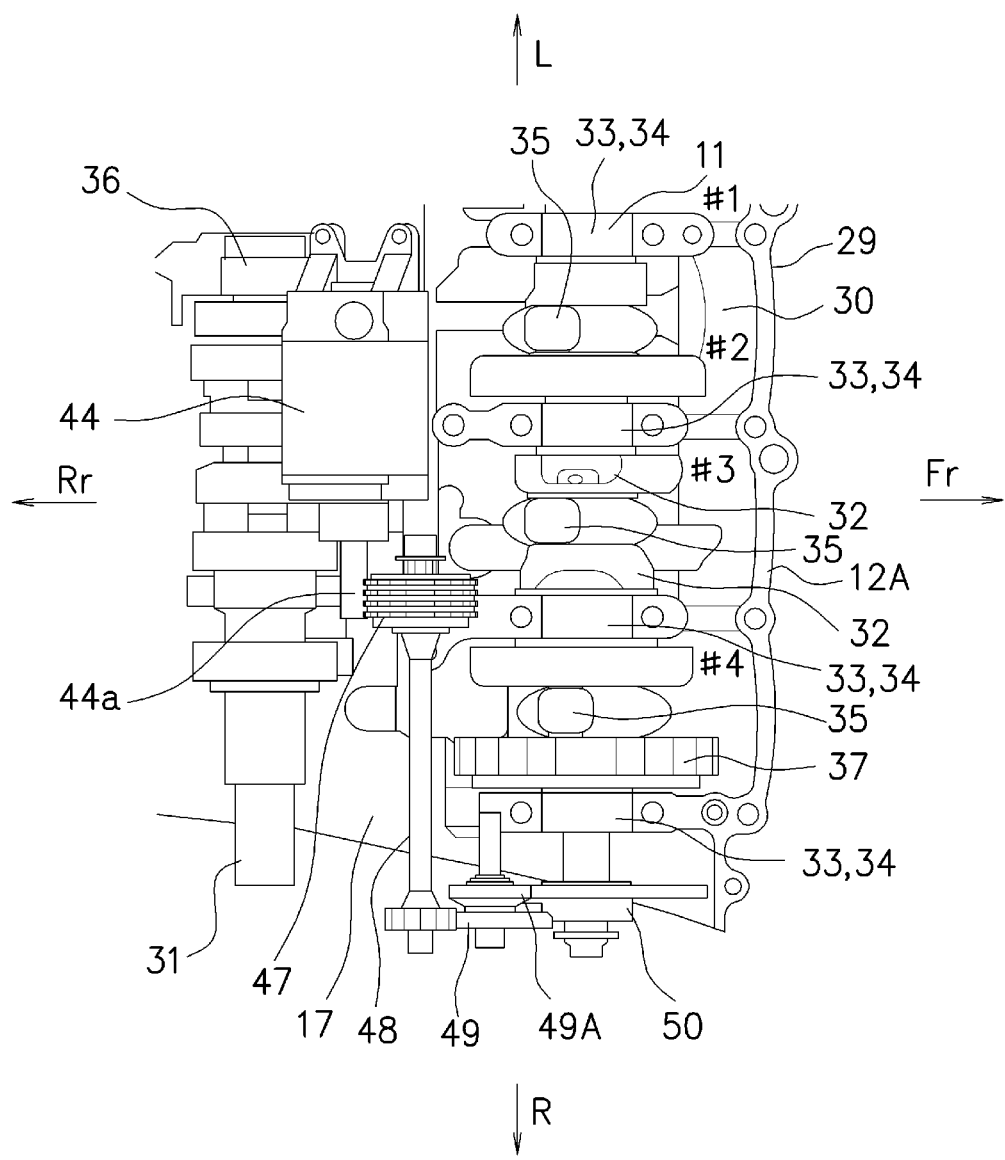
FIG. 5 is a plan view viewing a contact surface of a lower case according to the embodiment of the present invention from above.

With reference to FIG. 4 and FIG. 5 as well, the following describes a specific exemplary configuration around the crankcase 12. FIG. 4 is a right side view illustrating a state of removing a clutch cover 27 (see FIG. 1) from the crankcase 12. FIG. 5 is a plan view viewing a contact surface 12A of a lower case 29 among an upper case 28 and the lower case 29 constituting the crankcase 12 from above. In this embodiment, the crankcase 12 is vertically divided into the upper case 28 and the lower case 29. Closing both forms a crank chamber 30. In this case, the cylinder block 13 is integrated with the crankcase 12, that is, integrally molded with the upper case 28. To the contact surface 12A of the crankcase 12, the crankshaft 11 and a counter shaft 31, which is a gear-shift input shaft, are journaled. As illustrated in FIG. 4, the contact surface 12A is inclinedly configured upward to the rear.

The crank chamber 30 of the crankcase 12 internally includes the crankshaft 11 and a crank web 32 integrated with the crankshaft 11. The crank web 32 is rotatably journaled to the contact surface 12A with a plurality of (five in this example) journal portions 33 via a journal bearing 34. Corresponding to the cylinders, between the mutual crank webs 32, a coupling rod 35 is coupled via a crank pin. A piston is swingably mounted to a distal end (a small end) of the coupling rod 35 via a piston pin. This piston vertically reciprocates in a cylinder bore of the cylinder block 13. The reciprocation motion of the piston rotatively drives the crankshaft 11.

In the transmission case 17, the counter shaft 31 is rotatably journaled to the contact surface 12A at the rear of the crankshaft 11 parallel to the crankshaft 11. The counter shaft 31 is supported via a bearing 36 or a similar member. One end (the right side) of the crankshaft 11 projects to inside a clutch chamber, and a primary drive gear 37 is axially supported to this end. On the other hand, to one end (the right side) of the counter shaft 31, a primary driven gear 38, which engages the primary drive gear 37, is axially supported. The rotation of the crankshaft 11 ensures rotatably driving the counter shaft 31. A clutch device 39 is configured at an end of the counter shaft 31 projecting to the clutch chamber side. This clutch device 39 connects and cuts off a power between the crankshaft 11 and the counter shaft 31. A clutch shaft of the clutch device 39 is disposed concentrically with the counter shaft 31.

Further, in the transmission case 17, the counter shaft 31 constitutes a part of a transmission housed in the transmission case 17. A drive shaft 40 is disposed approximately below the counter shaft 31. A plurality of transmission gears are disposed in a row on the respective counter shaft 31 and drive shaft 40. A gear shift device selectively configures a meshing relationship of these transmission gears. Thus, a desired transmission ratio of the transmission is obtained. The power from the engine 10 goes through from the crankshaft 11 to the transmission and is finally transmitted to a drive sprocket 41 (see FIG. 3), which is mounted to a shaft end of the drive shaft 40. As described above, this drive sprocket 41 rotatively drives a driven sprocket, that is, the rear wheel 106, via a power transmission chain.

Figure 6:
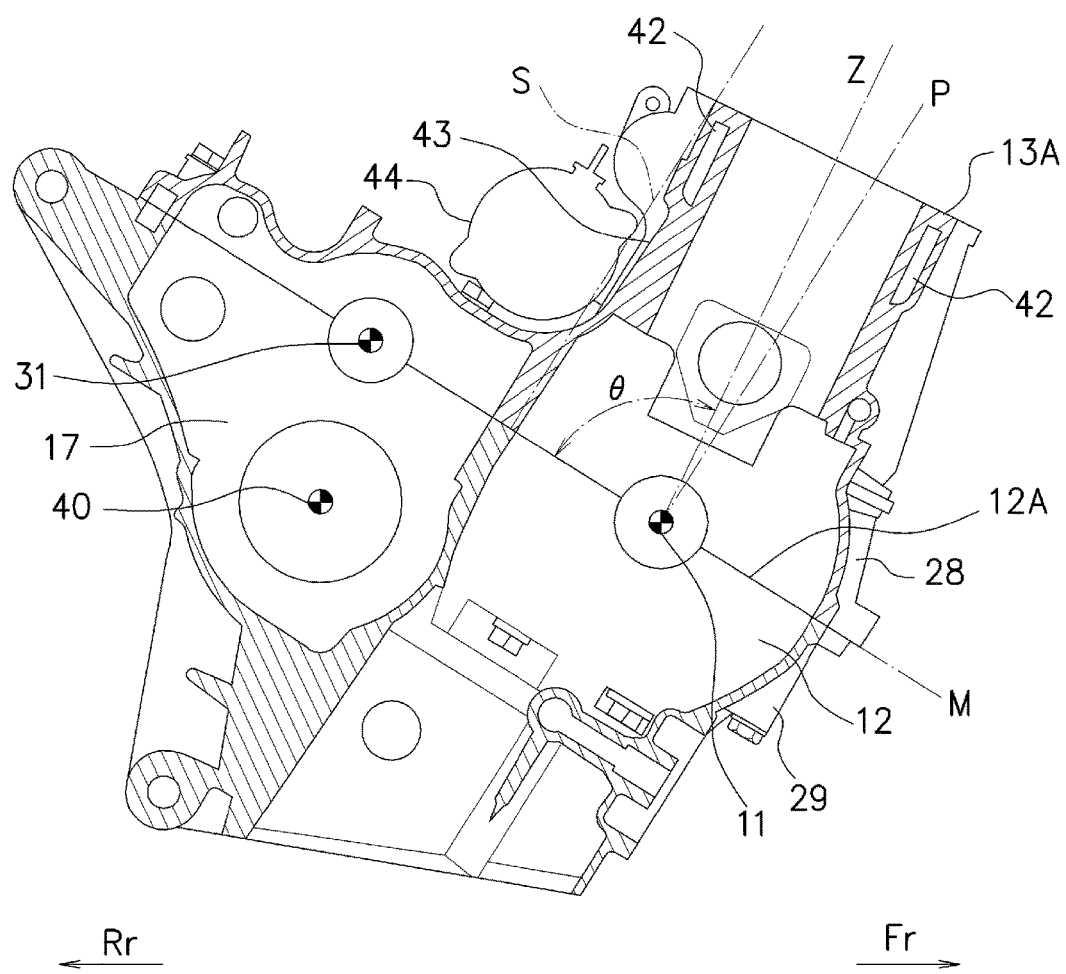
FIG. 6 is a cross-sectional view schematically illustrating a configuration where a cylinder block according to the embodiment of the present invention is inclined rearward.

In the engine 10 configured as described above, the present invention especially arranges the cylinder block 13 to be inclinedly rearward such that, as illustrated in FIG. 4, an extended line M that connects respective central axes of the crankshaft 11 and the counter shaft 31 intersects with the cylinder axis line Z of the cylinder block 13 at an acute angle θ in an engine side view. As also illustrated in FIG. 6, the extended line M is on the contact surface 12A between the upper case 28 and the lower case 29 of the crankcase 12. The cylinder axis line Z is set to be inclined rearward with respect to a vertical line P, which starts from this contact surface 12A and passes through the crankshaft 11.

Figure 7:
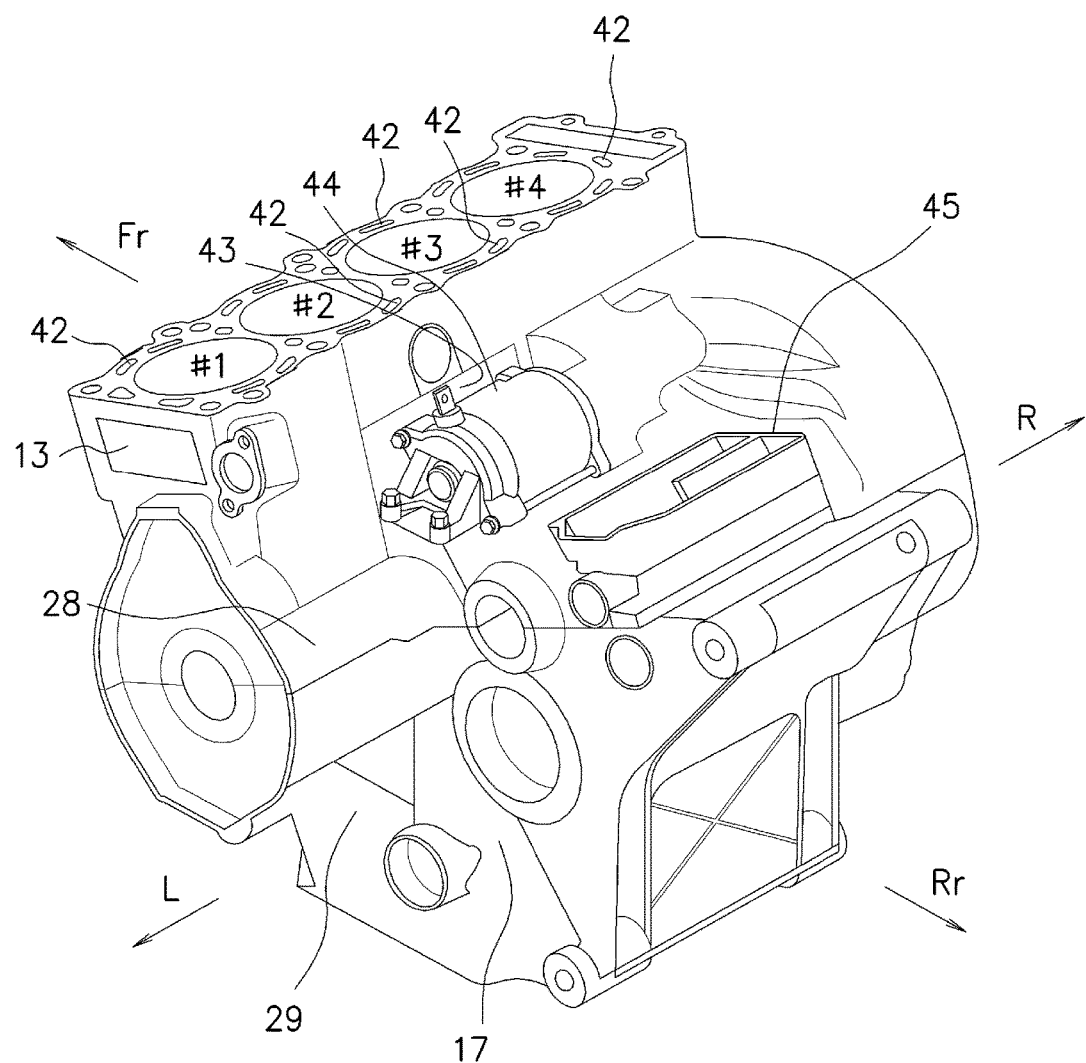
FIG. 7 is a rear perspective view of the crankcase according to the embodiment of the present invention.

As illustrated in FIG. 6, a U shape 43 is formed at the rear surface of the cylinder block 13 and the lower side of a water jacket 42. The U shape 43 is formed on the cylinder block 13 on the cylinder axis line Z-side with respect to a surface (a vertical surface S), which is a surface formed vertically from a profile of a contact surface 13A with the cylinder head 14 to the contact surface 12A of the crankcase 12. As also illustrated in FIG. 7, a starter motor 44 is disposed on the U shape 43. As described above, the cylinder axis line Z is inclined rearward and intersects with the extended line M, which connects the crankshaft 11 and the counter shaft 31, by the acute angle θ. Therefore, the rear side of the cylinder block 13 forms a concaved shape with respect to the vertical surface S.

In the above-described case, as illustrated in FIG. 7, the U shape 43 of the cylinder block 13 is disposed at the center in an engine width direction. The U shape 43 approximately corresponds to the cylinder #2 and the cylinder #3.

Also with reference to FIG. 3, a breather chamber 45 integrated with the upper case 28 is disposed at the rear of the starter motor 44. The breather chamber 45 includes a breather chamber cover 46 (FIG. 3). The breather chamber 45 separates introduced blow-by gas into gas and liquid and flows back the separated gas to the intake system.

Here, with reference to FIG. 5, an output shaft 44a of the starter motor 44 is disposed in the right-left direction, that is, parallel to the crankshaft 11 and extends rightward. The output shaft 44a engages a torque limiter 47 axially supported to a driving power transmitting shaft 48, which is extended parallel to the crankshaft 11, between the output shaft 44a and the crankshaft 11. The torque limiter 47 transmits only a torque from the starter motor 44 to the crankshaft 11 side and cuts off a torque from the crankshaft 11 side to the starter motor 44 side. The torque limiter 47 is coupled to the crankshaft 11 via a plurality of idle gears 49. In this case, an idle gear 49A at a final stage engages a one-way clutch 50, which is axially supported to a right end of the crankshaft 11. An actuation of the starter motor 44 forcibly rotates the crankshaft 11 via the torque limiter 47, the idle gear 49, or a similar member, thus allowing the engine 10 to start.

With the engine 10 of the present invention, the extended line M intersects with the cylinder axis line Z of the cylinder block 13 at the acute angle θ, that is, the cylinder block 13 is inclined rearward. This ensures appropriately configuring a distance between the front wheel 104 and the crankshaft 11 while the height of the crankshaft 11 is maintained. That is, the distance between the front wheel 104 and the crankshaft 11 can be effectively shortened, ensuring an improvement in controllability and stability. In this case, since the height position of the crankshaft 11 does not substantially change, the layout is possible while the crankshaft 11 does not interfere with an air cleaner box, a fuel tank, and a similar member disposed above the engine 10, that is, the crankshaft 11 does not affect the positional relationship with the other components. Inclining the cylinder block 13 rearward ensures disposing the exhaust pipe 18, the radiator 24, and a similar member close to the engine 10 side, allowing effectively shortening the wheel base.

The U shape 43 is disposed at a rear surface of the cylinder block 13 and a lower side of the water jacket 42, and the starter motor 44 is disposed on this U shape 43. Inclining the cylinder block 13 rearward causes the cylinder block 13 to interfere with the starter motor 44, which is disposed at the rear. The present invention ensures the arrangement with good space efficiently without shifting the starter motor 44 rearward with respect to the U shape 43 at the rear surface of the cylinder block 13. The use of a setting core makes it possible to properly form the U shape 43 at the rear surface of the cylinder block 13.

Shifting the starter motor 44 rearward increases a distance between the shafts, the output shaft 44a of the starter motor 44 and the crankshaft 11, resulting in an increase in the number of the idle gears 49 and similar components to couple the shafts. In contrast to this, the present invention ensures disposing the starter motor 44 using the U shape 43 without the increase in the number of components.

With the present invention, the cylinder block 13 is integrated with the crankcase 12, ensuring effectively enhancing the rigidity of the crankcase 12. If the cylinder block 13 is separated from the crankcase 12, compared with the case of the cylinder block 13 integrated with the crankcase 12, the rigidity of the crankcase 12 is degraded. This possibly causes problems such as an increase in noise, a mechanical loss, and an increase in weight.

Further, the present invention includes the breather chamber 45 integrated with the upper case 28 of the crankcase 12 at the rear of the starter motor 44.

With the positional relationship between the starter motor 44 and the breather chamber 45, shifting the starter motor 44 rearward makes it difficult to secure a capacity for the breather chamber 45. On the other hand, shifting the breather chamber 45 rearward corresponding to the starter motor 44 affects a positional relationship with other components disposed nearby, possibly losing layoutability of the components. As described above, the present invention uses the U shape 43. This achieves the arrangement with good space efficient without shifting the starter motor 44 rearward, allowing securing and maintaining the appropriate layoutability of the peripheral components and a similar feature.

While the present invention has been described using various embodiments above, the present invention is not limited only to these embodiments. Changes and similar modification are possible within the scope of the present invention.

The embodiment describes the example where the engine 10 is the parallel four-cylinder engine; however, the number of cylinders can be increased and decreased appropriately. The rearward inclination angle of the cylinder axis line Z can be set appropriately according to specifications of the engine, the vehicle type, or a similar condition.

According to the present invention, the rearward inclination of the cylinder block ensures appropriately configuring the distance between the front wheel and the crankshaft while the height of the crankshaft is maintained, ensuring an improvement in the controllability and stability of the vehicle. Since the height position of the crankshaft does not substantially change, a layout without affecting the positional relationship with other components is possible. The rearward inclination of the cylinder block ensures disposing the exhaust pipe, the radiator, and a similar member close to the engine side. This allows the wheel base to be effectively shortened.

What is claimed is:
1. A four-cycle multi-cylinder engine comprising:
a crankcase vertically divided into an upper case and a lower case;
a cylinder block integrated with the crankcase; and
a crankshaft and a counter shaft journaled to a contact surface of the upper case and the lower case, wherein the cylinder block is inclined rearward such that an extended line intersects with a cylinder axis line of the cylinder block at an acute angle in an engine side view, the extended line connecting respective central axes of the crankshaft and the counter shaft.

2. The four-cycle multi-cylinder engine according to claim 1, wherein
the cylinder block has a U shape at a rear surface of the cylinder block and a lower side of a water jacket, the U shape being formed on the cylinder block on the cylinder axis line side with respect to a surface formed vertically from a profile of a contact surface with a cylinder head to the contact surface of the crankcase, a starter motor being disposed on the U shape.

3. The four-cycle multi-cylinder engine according to claim 2, wherein
the U shape is disposed at an approximate center in an engine width direction.

4. The four-cycle multi-cylinder engine according to claim 3, further comprising
a breather chamber integrated with the upper case at a rear of the starter motor.

5. The four-cycle multi-cylinder engine according to claim 2, further comprising
a breather chamber integrated with the upper case at a rear of the starter motor.

* * * * *